Figure 1:
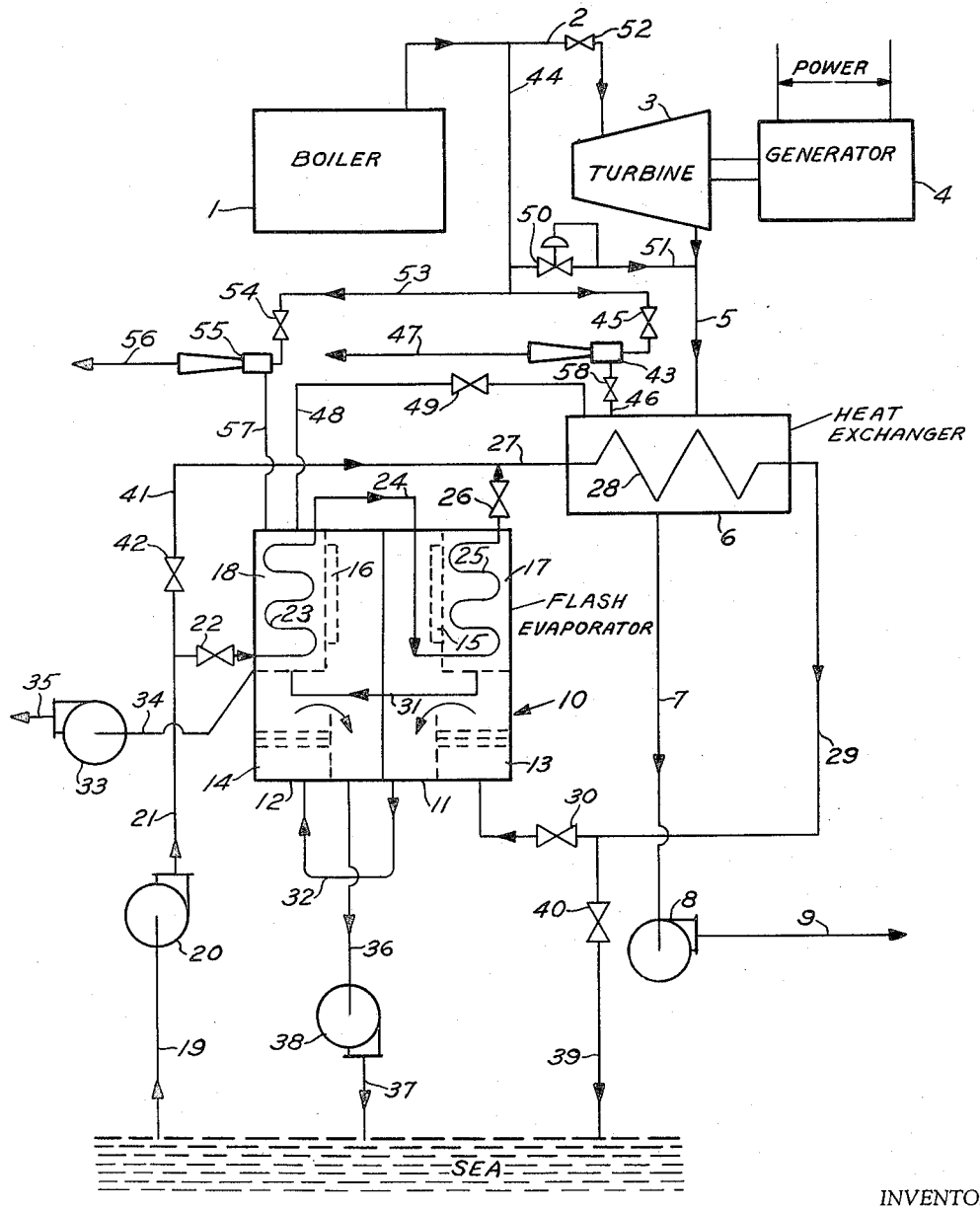

July 7, 1959

E. P. WORTHEN ET AL 2,893,926

COMBINED FLASH TYPE DISTILLING PLANT AND
BACK-PRESSURE TURBO-GENERATOR
Filed June 13, 1957

INVENTORS
Eugene Porter Worthen
Fenner Smith Barbour

BY Nevil Greenwell.

ATTORNEY

United States Patent Office 2,893,926
Patented July 7, 1959

2,893,926

COMBINED FLASH TYPE DISTILLING PLANT AND BACK-PRESSURE TURBO-GENERATOR

Eugene Porter Worthen, Braintree, and Fenner Smith Barbour, Wollaston, Mass., assignors to Bethlehem Steel Company, a corporation of Pennsylvania Application June 13, 1957, Serial No. 665,420

2 Claims. (Cl. 202—82)

This application relates generally to the utilization of steam for the production of electric power and distilled water, and more particularly to a flash-type evaporator in combination with a turbo-generator for effectuating the premises.

In all communities, there is, of course, a demand for fresh water and for electric power. In many coastal areas, there is a very limited supply of fresh water for human consumption and for industrial processes, although sea water may be available in practically limitless quantities. This is particularly true of some oil refinery installations in the Middle East and of certain islands in the West Indies. It will be apparent that to supply these areas, by tanker, with suitable quantities of fresh water would, at best, be inordinately expensive, and further, is certainly not an absolutely reliable way to make up for the lack of locally available fresh water, due to delays in transportation arising from one reason or another.

We have invented an apparatus and method which solves the problem of simultaneous uninterrupted generation of electric power and production of distilled water, all in an eminently efficient and economic manner. Briefly, our invention consists in the combination of a flash-type evaporator with a turbo-generator, constructed and operated as hereinafter described.

Accordingly, one of the objects of our invention is an apparatus and method to produce electricity and distilled water.

Another object of our invention is an apparatus and method using steam to drive a prime mover operating an electrical generator, the exhaust steam being used to heat feed water supplied to a flash evaporator, whereby continuous uninterrupted generation of electricity is assured regardless of failure or shutdown of the flash evaporator.

A further object of our invention is an apparatus and method for the simultaneous generation of electricity and distilled water wherein the ratio of electric power to distilled water may be varied as the demand for each varies.

Other objects and advantages of our invention will be apparent during the course of the following description which illustrates one embodiment of the invention, although said invention is capable of embodiment in many different ways. The illustrated embodiment is, therefore, to be regarded only as typical, and the invention is not to be confined thereto.

Figure 1 represents a flow diagram of one arrangement of our invention.

Boiler 1 generates steam which is fed, through line 2, to turbine 3, which is of the "back-pressure" type, driving electrical generator 4. Exhaust steam from turbine 3 passes through line 5 to heat exchanger 6 which serves as a feedwater heater for the evaporator 10 and as a condenser for the exhaust steam. Condensate from heat exchanger 6 flows through line 7 to pump 8, and thence through line 9 to the boiler feed water system (not shown).

Evaporator 10, shown only in diagrammatic form, is a flash evaporator, which may desirably be of the type described in our U.S. Patent No. 2,613,177. However, our invention is not limited to the use of the specific type of flash evaporator described in said patent. Evaporator 10 comprises first and second stage compartments 11 and 12 which, generally, are similar to each other in that they include, respectively, flash chambers 13 and 14, vapor separators 15 and 16, and condensers 17 and 18. For complete details as to various fittings, valves, gauges, and the like, reference should be made to U.S. Patent No. 2,613,177.

Sea water is taken from its source, through line 19, by means of pump 20, and is passed, through line 21 and valve 22, through tube nest 23 in condenser 18 of second stage compartment 12, thence through line 24 to tube nest 25 of first stage compartment 11, thence through valve 26 and line 27 to tube pass 28 of heat exchanger 6. The heated sea water is then passed through line 29 and valve 30 to flash chamber 13 of first stage compartment 11, where a portion of its flashes to steam as described in U.S. Patent No. 2,613,177. The distillate from condenser 17 of first stage compartment 11 passes through line 31 to the condenser 18 of second stage compartment 12. The feed remaining after flashing in first stage compartment 11 passes through loop seal 32 to flash chamber 14 of second stage compartment 12 where an additional portion flashes to steam. The distillate from second stage condenser 18 is taken by pump 33, through lines 34 and 35, to suitable storage tanks or the like (not shown). The concentrated brine left after flashing in second stage compartment 12 is returned to the seat through lines 36 and 37 by means of pump 38.

It will be noted that, between valve 30 and heat exchanger 6, we have provided line 39, and valve 40, leading from line 29 to the sea. Also, between pump 20 and valve 22, we have provided line 41, and valve 42, leading from line 21 to line 27 between valve 26 and heat exchanger 6.

Evaporator 10 works under reduced pressure, as explained in U.S. Patent No. 2,613,177. Consequently, we provide means for exhausting the interior thereof. It will also be apparent that the efficiency of turbine 3 may be improved if means in addition to pump 8 are provided to exhaust the shell of heat exchanger 6, although the provision of said means is not absolutely necessary. There are many ways, which will immediately occur to those acquainted with the art, to evacuate evaporator 10 and heat exchanger 6. As this is not the essence of our invention, we show one manner of accomplishing this end, and it will be understood that this is for illustrative purposes only, and that other evacuating arrangements may be applied to the same end. We show flash evaporator air ejector 55 actuated by steam taken from line 2 through lines 44 and 53 and valve 54. Flash evaporator air ejector 55 communicates through line 57 with the last stage of flash evaporator 10 (the second stage of the two stage flash evaporator 10 shown in Fig. 1), and exhausts through line 56 into a conventional ejector condenser (not shown). The sell of heat exchanger 6 is vented through line 48 and valve 49 to the last stage of flash evaporator 10. It will be apparent to those familiar with the art that the pressure in the last stage of flash evaporator 10 is less than in the shell of heat exchanger 6, and that the flow of air is always from the shell of heat exchanger 6 into the last stage of flash evaporator 10. The foregoing represents normal operating procedure.

To provide for the situation in which flash evaporator 10 is shut down, and heat exchanger 6 is operated as a condenser for turbine 3, we show heat exchanger air ejector 43 actuated by steam taken from line 2 through line 44 and valve 45. Heat exchanger air ejector 43 communicates with the shell of heat exchanger 6 through line 46 and valve 58, and exhausts through line 47 to a conventional ejector condenser (not shown). In this instance, valves 49 and 54 will be closed.

Of course, under normal operating procedure when flash evaporator air ejector 55 is in use, and heat exchanger air ejector 43 is not in use, valve 58 will be closed to prevent back flow of air through heat exchanger air ejector 43 into the shell of heat exchanger 6. Also, valve 45 will be closed.

We provide reducing valve 50 on line 51 running from line 44, between line 2 and valve 45, to line 5. If desired, line 51 could alternatively be tied directly into line 2, rather than to line 44. We provide valve 52 in line 2 between line 44 and turbine 3. When it is desired to completely shut down turbine 3 without interfering with the operation of flash evaporator 10, valve 52 is closed. The function of reducing valve 50 and line 51 will be explained further on.

The apparatus having been described, we will now explain the operation thereof under various conditions.

A. *Normal demand for electricity and distilled water.*—Valves 40, 42, 45 and 58 are closed. Valves 22, 26, 30, 54, 49 and 52 are open. Steam is supplied to turbine 3 through line 2, and is exhausted through line 5 to heat exchanger 6. Thus, generator 4 is operated to supply the electrical demand. Reducing valve 50 may be set so that steam from line 51 supplements the exhaust steam from turbine 3, whereby enough thermal energy is supplied the heat exchanger 6 to meet the demand for distilled water.

Sea water is taken from the sea and is passed through tube nest 23 in condenser 18 of second stage compartment 12. Here, the sea water will condense vapors flashed off from the feed to flash chamber 14 of second stage compartment 12, and the temperature of the sea water will therefore rise. The sea water then passes through line 24 to tube nest 25 in condenser 17 of first stage compartment 11. Here, the sea water will condense vapors flashed off from the feed to flash chamber 13 of first stage compartment 11, and in so doing, the temperature of the sea water will be further raised. The sea water then passes through tube pass 28 of heat exchanger 6 where, in condensing the shell side steam therein, the temperature of the sea water is raised again. The heated sea water feed now passes to flash chamber 13 of first stage compartment 11, where part thereof is flashed off. The flashed vapors are condensed in condenser 17 by the sea water in tube nest 25, and the condensate passes through line 31 to condenser 18. The feed remaining in flash chamber 13 (that is to say, the unflashed portion of the heated sea water feed) passes through line 32 to flash chamber 14 of second stage compartment 12, where part thereof is flashed off, condensed in condenser 18, combined with the condensate from condenser 17, and pumped by means of pump 33 to suitable storage tanks. The unflashed sea water (now concentrated brine) is returned to the sea through line 36.

We have just described the application of our invention to meet the local demand for electricity and distilled water. No actual values of temperature and pressure have been given, as these may depend on the economics of the overall installation, the capacities of the turbine and generator, the number of turbines and generators (obviously, this invention can incorporate a series of turbines and/or generators), the number of stages in evaporator 10 (a first and second stage have been shown, but additional stages can be used), and upon other factors. The sea water when taken from its source will probably be close to 85° F., although its temperature may vary from 32° F. to 90° F., depending upon the locality.

B. *Failure of flashing in evaporator.*—The apparatus may be set as in (A), or (C) or (D) as described further on. Let it be assumed that the sea water feed fails to flash in either flash chamber 13 or flash chamber 14. In our invention, we condense the steam exhausting from turbine 3 to heat exchanger 6 by passing the sea water from tube nests 23 and 25 to tube pass 28. The flow of sea water through these tube nests 23 and 25 and thence through tube pass 28 is not in any way affected by failure of flashing in the flash chambers 13 and 14, with the result that condensation of exhaust steam in heat exchanger 6 is completely independent of erratic or faulty operation of flash evaporator air ejector 55. Thus, regardless of the state of flashing in evaporator 10, no excessive back pressure on the turbine 3 will build up to close the throttle valve to the turbine 3, and the generation of electricity will continue uninterrupted.

Actually, what occurs when flashing ceases is that the sea water passing through tube nests 23 and 25 is not raised to its normal operating temperature (as no flashed vapors rise to the condensers 17 and 18 to give their heat to the sea water in the tube nests). Thus, the sea water enters tube pass 28 of heat exchanger 6 at a lower than normal temperature, which further lowers the pressure in the shell of heat exchanger 6, which may cause turbine 3 to operate more efficiently.

C. *Low electrical load and high water demand.*—The apparatus is operated as in (A), except for the setting of reducing valve 50 which may be opened so as to feed more steam from line 51 to line 5. In case of zero electrical load, it may be desired to completely shut down turbine 3, in which instance valve 52 will be closed. Thus, in the event the electrical load decreases while the requirement for fresh water remains high, steam can be supplied to the shell of heat exchanger 6 directly from boiler 3. If desired, reducing valve 50 may be arranged to maintain the steam pressure in the shell of heat exchanger 6 constant so as to insure a steady output of fresh water regardless of fluctuations in electrical load and quantity of exhaust steam.

D. *High electrical load and low water demand.*—The apparatus is operated as in (A), except for the setting of reducing valve 50 which may be closed, so that the heat exchanger 6 receives only exhaust steam from turbine 3. Alternative to, or supplemental to, the operation just described, valves 22 and 30 may be partially opened to permit sufficient heated feed to flow to evaporator 10 to produce the requisite water, while valves 40 and 42 may be opened sufficiently to permit enough sea water to flow through tube pass 28 of heat exchanger 6 to condense steam exhausting from turbine 3 at full load.

E. *Evaporator shut down for routine maintenance.*—Valves 22, 26, 30, 49, 50 and 54 are closed. Valves 40, 42, 45, 46 and 52 are open. Pump 20 then circulates sea water directly from the sea to heat exchanger 6 and then back to the sea, through lines 19, 21, 41, 27, through tube pass 28, and through lines 29 and 39. In this manner, production of electric power continues, even though the evaporator 10 is not working.

The arrangement shown in Fig. 1 can be varied in many ways without departing from the spirit of our invention. The number of evaporator stages actually provided in a specific installation may be varied depending upon the ratio of the long-term or overall average electric power demand to the long-term or overall average fresh water demand. For example, with a low overall power demand and a high overall water requirement, evaporator 10 should have a large number of stages providing a high efficiency to produce the required amount of distilled water. Conversely, with a relatively high overall electric power demand and a low overall fresh water demand, evaporator 10 should have fewer stages since there would be an ample supply of exhaust steam available. In some installations, it might be advisable, from an economic point of view, to provide only one stage. By varying the number of stages, then, it is possible to cover a wide range of ratios of overall electric demand to overall fresh water demand.

On large installations, it may be advantageous to provide several heat exchangers as, for instance, two heat exchangers 6, both of which may be operated in parallel when evaporator 10 is producing fresh water at full capacity. This permits taking one heat exchanger out of service for cleaning while still operating evaporator 10 and turbine 3 at reduced capacity using the other heat exchanger 6. If with any such particular installation it should be necessary to maintain production of fresh water at full capacity at all times, an additional heat exchanger may be provided, so that full production can be maintained while one exchanger is down for maintenance. Other arrangements in series or parallel of the various evaporator stages, additional boilers, generators, turbines and the like will be evident to those familiar with the art.

Further, in place of turbine 3, a reciprocating steam engine may be used, in which instance the steam exhausting from said engine would be led to the shell of heat exchanger 6.

Finally, in place of the steam in the boiler-turbine-heat exchanger shell circuit, our invention may include the utilization of other normally condensible hot vapors.

Although we have shown and described our invention in some detail, we do not wish to be limited to the exact arrangement shown and described, but may use such substitutions, modifications or equivalents thereof as are embraced within the scope of our invention or as pointed out in the claims.

We claim:

1. Apparatus for the distillation of sea water and the production of electricity, comprising steam-generating means, a back-pressure steam turbine, an electrical generator driven by said steam turbine, a heat exchanger comprising a first side and a second side, a flash evaporator comprising a flash chamber and a condenser, first means to pass steam from said steam generating means to said back pressure steam turbine, second means to pass steam exhaust from said turbine to the first side of said heat exchanger, third means to pass sea water to the second side of said heat exchanger, fourth means to pass the sea water from the second side of said heat exchanger to the flash chamber of said flash evaporator, fifth means to pass steam from said steam generating means to said first side of said heat exchanger, and sixth means to regulate the amount of steam flowing through said fifth means to maintain the pressure in the first side of said heat exchanger at a predetermined value independent of fluctuations in electrical load.

2. Apparatus comprising a source of steam, a back pressure turbine, first means for supplying steam from said steam source to said turbine for operating the same, a heat exchanger, a flash evaporator, a condenser for condensing water vapor produced in said flash evaporator, second means for supplying exhaust steam from said turbine to said heat exchanger, third means for supplying steam from said steam source to said heat exchanger, fourth means for controlling the amount of steam supplied to said heat exchanger from said second and third steam supplying means, fifth means for supplying feed water to said condenser and thence to said heat exchanger, sixth means for supplying feed water to said heat exchanger, seventh means for controlling the amount of feedwater supplied to said heat exchanger from said fifth and sixth feedwater supplying means, eighth means for supplying heated feedwater to said flash evaporator, ninth means for discharging heated feedwater to waste and tenth means for controlling the amount of heated feedwater supplied to said flash evaporator and to waste through said eighth and ninth means respectively.

References Cited in the file of this patent

UNITED STATES PATENTS

| | | |
|---|---|---|
| 2,027,395 | McVoy | Jan. 14, 1936 |
| 2,613,504 | Warren | Oct. 14, 1952 |
| 2,663,683 | McAndrews | Dec. 22, 1953 |